Dec. 13, 1938.  L. LAMER  2,140,234

MOLDING

Filed Sept. 1, 1937

Louis Lamer
Inventor

By Eugene P. Perens
His Attorney

Patented Dec. 13, 1938

2,140,234

UNITED STATES PATENT OFFICE 2,140,234

MOLDING

Louis Lamer, New York, N. Y.

Application September 1, 1937, Serial No. 162,021

4 Claims. (Cl. 20—74)

My invention relates to improvements in moldings and has particular reference to finishing moldings such as are generally used in display, decorative, architectural and fixture fields.

Briefly and generally the invention has for its primary object to provide a novel molding and means for fastening same in place without necessitating the driving of tacks or nails through the molding.

More specifically it is an object of the invention to provide an improved finishing molding embodying a filler member and a covering member and wherein the filler member provides tack or nail retaining grooves which open at at least one end of the molding so that the tacks or nails can be inserted into the grooves.

Furthermore, the invention contemplates the provision of moldings of different widths and provided with one or a plurality of nail-receiving grooves in a filler member or the equivalent.

The invention also resides in certain novel features of invention, combination and arrangement of the various parts and in modes of use, all of which will be readily understood and appreciated by those skilled in the art upon reference to the accompanying drawing in connection with the detailed description to follow.

It is to be understood that the drawing and following description deals with what is now considered as a preferred mechanical expression of the invention. However, various changes may be made within the spirit and scope of the subject matter claimed hereinafter.

In the drawing, wherein the same reference characters have been used to designate the same parts in all views, Figure 1 is a perspective view of a portion of a finishing molding embodying my invention and showing the fastening nails in place;

Figure 1:
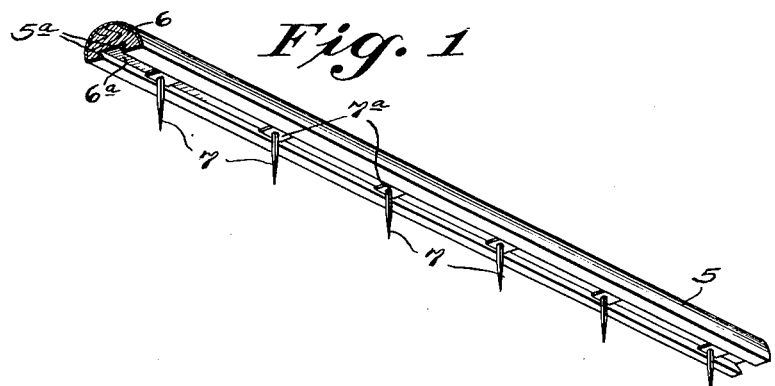
Figure 2:
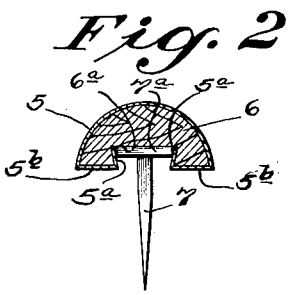
Figure 2 is a cross-sectional view through the molding of Figure 1.

Referring specifically to the drawing and turning to the form of invention shown in Figures 1 and 2, it will be noted that the molding illustrated comprises the metal covering member 5 and the filler member 6, which latter provides the longitudinal groove 6a in its flat inner surface. The walls of the groove 6a, as will be noted, are undercut for the purpose of retaining the nails 7 in place as will be presently explained more in detail. In the illustrated instance, groove 6a is dovetailed in cross section as shown, but this specific form of undercut groove 6a is not absolutely essential as will be hereinafter understood.

The metal covering member 5 is bent to conform to the curved exterior surface of the filler member 6 and the inner longitudinal edges of the covering member 5 are bent inwardly as indicated at 5a to lie along the side walls of the dovetailed groove 6a in the filler member 6. The portions 5b of the covering member 5 inwardly of the portions 5a lie contiguous with the rear face of the filler member 6.

Inasmuch as the material of which the covering member 5 is formed is metal, there will be some slight tendency for the inturned longitudinal edges 5a to spring away from the side walls of the dove-tail groove 6a of the filler member 6. Therefore when the heads 7a of the nails 7 are inserted in place the opposed portions or longitudinal edges 5a, 5a within the dove-tail groove 6a will tend to frictionally engage the heads 7a of the nails to hold the same in place and in proper spaced relationship. Furthermore, the fact that the walls of groove 6a are beveled outwardly of the direction of their depth—and portions 5a, 5a of the covering member 5 conform thereto—the heads of the nails 7 will be held against the back wall of the groove 6a of the filler 6.

Figure 4:
Figure 4 is a perspective view of one form of fastening nail that may be used.

While I have made the heads 7a of the nails 7 square, as shown in Figure 4, yet it will be obvious that such heads 7a will be made in other shapes, the important thing being that the widths of the heads 7a of the nails 7 shall be such as to engage the inturned portions 5a, 5a of the molding covering portion 5, so that the top surfaces of the heads 7a of the nails will be held against the bottom wall of the groove 6a.

Figure 3:
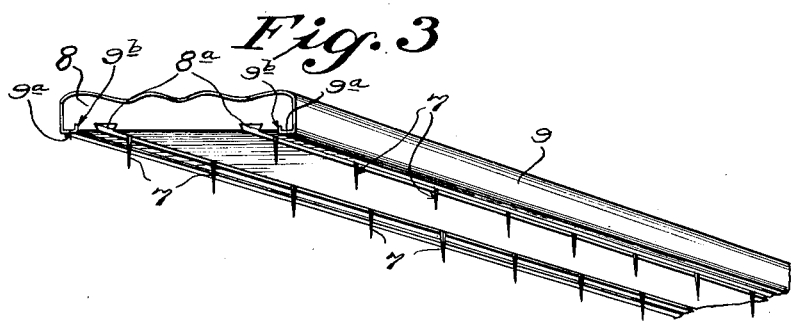
Figure 3 is a perspective view of a modified form of finishing molding such as might be used for a baseboard in a dwelling house.

Coming now to the form of invention shown in Figure 3, it will be observed that I have provided a molding of considerable width, such as might be used for a base-board in a room. This molding, as shown in Figure 3, is provided with a covering 9 which will preferably be of metal although it may be made of other materials. Covering 9 is disposed over the front and longitudinal edge surfaces of a filler member 8 and it will be noted that the longitudinal edge portions 9a are bent to lie contiguous with at least a portion of the rear surface of the filler member 8. Numeral 9b illustrates that the inner edges of portions 9a of covering member 9 are imbedded in the rear surface of the filler member 8 so as to make sure that the covering member 9 will be held in place, at all times The outer surface of the filler member 8 may be suitably beveled in the direction of its length as shown and the covering member 9 is formed to conform to the outer surface shape of the filler 8. The filler 8 will preferably be of wood but may be made of other material. In the present instance I have illustrated the filler 8 as provided with two longitudinally extending dove-tail grooves 8a for the purpose of receiving the heads 7a of nails 7 such as illustrated in Figures 1, 2 and 4.

From the foregoing description taken in connection with the accompanying drawing it will be evident that my novel and approved molding can be readily applied in place without necessitating the driving of nails through the same from the outside. Any means of applying continuous or steady pressure to the molding is acceptable for forcing the nails into place and the rear surface of the molding into flat contact with the wall or other surface that is to carry same. Whatever apparatus or means is used for forcing the molding into place can be covered with cloth so as to avoid marring of the covering 5 of Figure 1 or the covering 9 of Figure 3. It will be evident that when the molding is fixed in place the binding of the rear surface thereof against the wall or other surface will hold the covering 5 of Figure 1 and 9 of Figure 3 in place. It is considered desirable, as shown in Figure 1 to extend the longitudinal edges 5a of the molding into the dove-tail groove 6a not only to take advantage of what slight outward springing tendency there might be in the longitudinal edges 5a of such molding covering 5, but also to provide a smooth hard surface for facilitating the sliding of the heads 7a of the nails into the proper positions spaced in the direction of the length of the molding. In respect to the form of invention shown in Figures 1, 2 and 3, the essential thing in respect to the portions 5a of the covering 5 that lie within the groove 6a is that they shall crowd the head 7a of the nail or tack 7 against the back wall of the groove whereby to frictionally hold the nails 7 in a set position. The advantage of using a covering material 5 of spring metal is that the portions 5a thereof tend to spring slightly away from the wall of the undercut groove 6a to bear against at least a portion of the under surface of the heads 7a of the nails.

I claim:

1. The combination of a finishing molding providing a metal covering member and a filler member, the filler member having a dove-tail groove extending longitudinally in its rear surface and the covering member being disposed contiguous with the filling member at the outer surface thereof and having longitudinal edges extending into and thence laterally to substantially engage the side walls of the dove-tail groove of the filler member, and nails inserted in said dove-tail groove and bearing against the inturned portions of said covering member which latter provide a smooth surface to facilitate sliding of the heads of the nails into proper lineal spacement in the groove and frictionally holding the same in proper spaced relationship.

2. The combination of a finishing molding comprising a filler and a covering strip, said filler strip provided with a longitudinal groove, nails slidably arranged in said groove, and said covering strip made of resilient metal and anchored to the filler by engagement with the side walls of the groove, said engagement serving as means to frictionally hold said nails in spaced relationship in the groove.

3. The structure of claim 2, said groove being dove-tailed, and said covering strip provided with opposed longitudinal edges bent upwardly and inwardly to lie along the side walls of said groove and having a tendency to spring away from the walls.

4. The combination of a finishing molding comprising a filler and a covering strip, said filler strip provided with a longitudinal groove, fastening elements slidably arranged in said groove and provided with enlarged heads, said covering strip provided with opposed flanges of a resilient nature for engaging and anchoring said cover in said groove, and the heads of said fastening elements gripped and held in place against the back wall of the groove by the resilient action of said flanges.

LOUIS LAMER.